United States Patent
Ugale et al.

(10) Patent No.: US 10,474,588 B1
(45) Date of Patent: Nov. 12, 2019

(54) METHOD AND SYSTEM FOR MEMORY-BASED DATA CACHING

(71) Applicant: EMC IP Holding Company LLC, Hopkinton, MA (US)

(72) Inventors: Rahul B. Ugale, Santa Clara, CA (US); Satish Visvanathan, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 283 days.

(21) Appl. No.: 15/480,161

(22) Filed: Apr. 5, 2017

(51) Int. Cl.
  *G06F 3/06* (2006.01)
  *G06F 12/128* (2016.01)
  *G06F 12/122* (2016.01)
  *G06F 12/0864* (2016.01)

(52) U.S. Cl.
  CPC .......... *G06F 12/128* (2013.01); *G06F 3/0608* (2013.01); *G06F 3/0641* (2013.01); *G06F 3/0685* (2013.01); *G06F 12/0864* (2013.01); *G06F 12/122* (2013.01); *G06F 2212/6032* (2013.04); *G06F 2212/621* (2013.01); *G06F 2212/69* (2013.01)

(58) Field of Classification Search
  CPC .... G06F 12/128; G06F 3/0685; G06F 12/122; G06F 3/0608; G06F 12/0864; G06F 3/0641; G06F 2212/69; G06F 2212/621; G06F 2212/6032
  See application file for complete search history.

(56) References Cited

U.S. PATENT DOCUMENTS

| | | | | |
|---|---|---|---|---|
| 5,822,759 A * | 10/1998 | Treynor | ............... | G06F 12/122 711/134 |
| 9,201,796 B2 * | 12/2015 | Biswas | ............... | G06F 12/0862 |
| 9,285,999 B2 * | 3/2016 | Hu | ............... | G06F 3/0613 |
| 2006/0004957 A1 * | 1/2006 | Hand, III | ............ | G06F 12/0866 711/113 |
| 2014/0089592 A1 * | 3/2014 | Biswas | ............... | G06F 12/0862 711/133 |
| 2015/0010143 A1 * | 1/2015 | Yang | ............... | G09C 1/00 380/28 |
| 2015/0046385 A1 * | 2/2015 | Shimizu | ............... | G06F 3/0653 706/52 |

(Continued)

OTHER PUBLICATIONS

Webopedia, "Linked List", Mar. 14, 2017, pp. 1-2, https://web.archive.org/web/20170314190121/https://www.webopedia.com/TERM/L/linked_list.html (Year: 2017).*

*Primary Examiner* — Christopher D Birkhimer
(74) *Attorney, Agent, or Firm* — Womble Bond Dickinson (US) LLP (57) ABSTRACT

According to some embodiment, a backup storage system receives a request from a client for reading a data segment associated with a file object stored in a storage system. In response to the request, the system determines whether a cache hit counter associated with the data segment exceeds a cache hit threshold. The system further determines whether the data segment is associated with a file region of the file object that is frequently accessed. The system writes the data segment into a memory responsive to determining that the cache hit counter exceeds the cache hit threshold and the data segment is associated with the frequently accessed file region. Otherwise, the system writes the data segment into a solid state device (SSD) operating as a cache device.

17 Claims, 7 Drawing Sheets

(56) References Cited

U.S. PATENT DOCUMENTS

| | | | |
|---|---|---|---|
| 2015/0120859 A1* | 4/2015 | Kondo | G06F 12/0868 709/213 |
| 2015/0277764 A1* | 10/2015 | Ehrlich | G06F 3/0616 711/103 |
| 2016/0085446 A1* | 3/2016 | Kumabe | G06F 3/0649 711/146 |

* cited by examiner

METHOD AND SYSTEM FOR MEMORY-BASED DATA CACHING

FIELD OF THE INVENTION

Embodiments of the present invention relate generally to data storage systems. More particularly, embodiments of the invention relate to method and system for memory-based data caching.

BACKGROUND

Though there are numerous media options, the classic storage hierarchy is often described as hard disk drives (HDDs) providing slow, persistent storage and dynamic random access memory (DRAM) situated closer to processors providing fast, volatile storage. Flash-based solid state devices (SSDs) became available with latency and price between DRAM and HDD, though with limited endurance.

Traditional computer architectures include primary storage systems and backup (data recovery) storage systems. Typically when a primary system fails, data from storage system is replicated to the primary system. While replicating, it may be desirable to simultaneously access data directly, i.e., random access, from the storage system. Because of long latency of HDDs and high cost of DRAM, it is desirable to integrate SSDs as a caching layer in a cache hierarchy for improved performance.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to one aspect of the invention, a storage system may integrate solid state devices (SSD) as a caching layer for better random access performance in comparison with a storage system having only traditional spinning drives (e.g., traditional magnetic rotating disks). For example, SSDs can deliver about 500× more input/output operations per second (IOPS) than spinning drives but also have 5× the cost. SSDs, as well as other forms of flash memory, however, have a limited number of write-erase cycles after which a given region of memory cannot be rewritten. In one aspect, the storage system receives a request from a client for reading a data segment associated with a file object stored in a storage system. In response to the request, the storage system determines whether a cache hit counter associated with the data segment exceeds a cache hit threshold. The storage system determines whether the data segment is associated with a file region of the file object that is frequently accessed. The storage system writes the data segment into a memory responsive to determining that the cache hit counter exceeds the cache hit threshold and the data segment is associated with the frequently accessed file region. Otherwise, the storage system writes the data segment into a solid state device (SSD) operating as a cache device.

According to another aspect of the invention, the storage system hashes the file object to obtain one or more buckets. For each bucket, the storage system determines whether a bucket hit counter associated with a bucket chain of the bucket is low. The storage system determines whether any data segment in the bucket chain is frequently accessed. The storage system evicts the bucket from the memory responsive to determining that the bucket hit counter is low or that no data segment in the bucket is frequently accessed.

According to another aspect of the invention, the storage system tracks the cache hit counter associated the data segment, where the cache hit counter is indicative of cache hits from the memory, the SSD operating as a cache device, and a disk storage.

Figure 1:
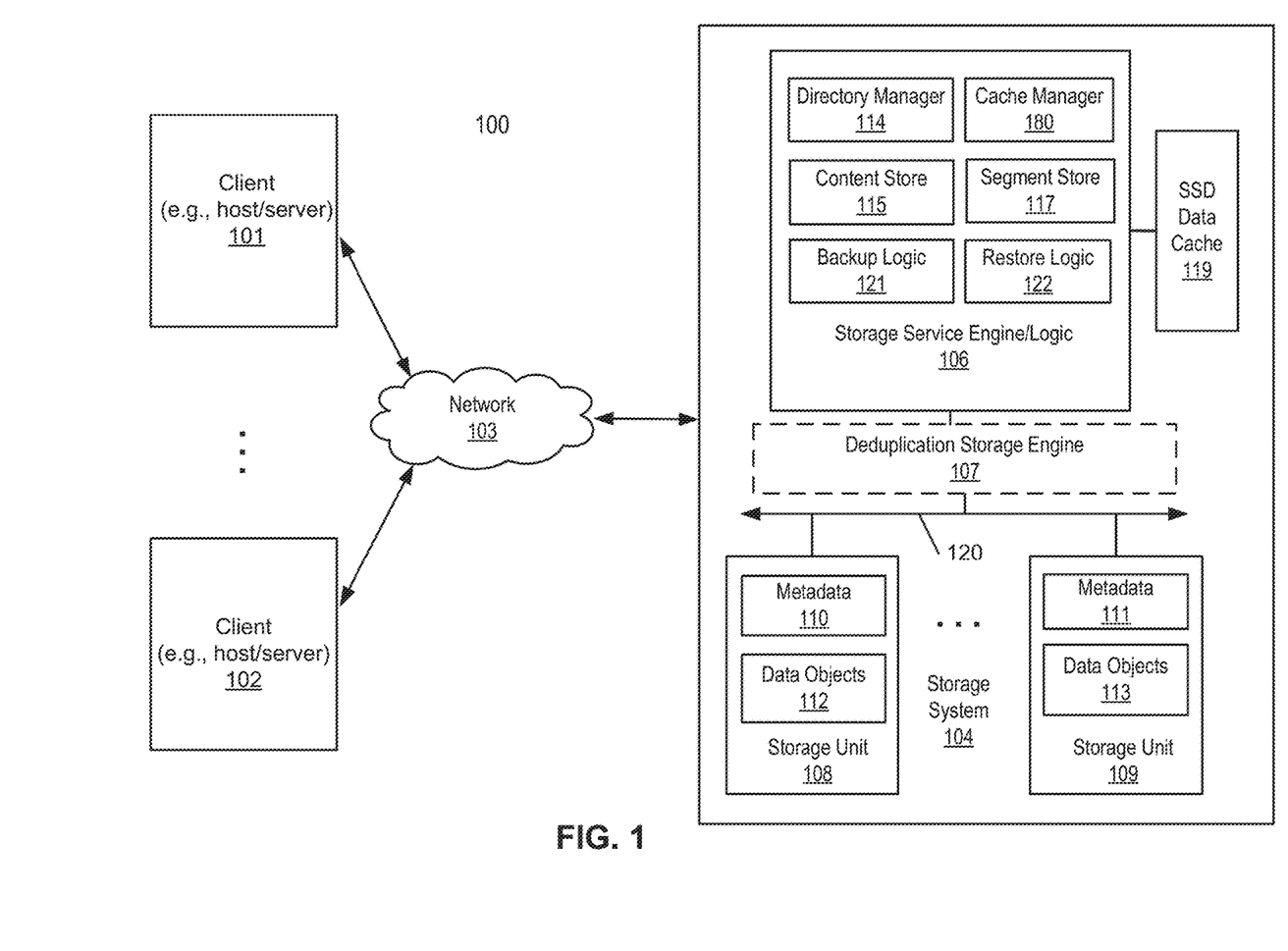
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include directory manager 114, content store 115, segment store 117, optional backup logic 121, optional restore logic 122, and cache manager 180. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102). Directory manager 114 is configured to manage files stored in a file system of the storage system. Content store 115 may be configured to receive file segments requests from directory manager 114 and to retrieve the file segments from storage units 108-109 (via segment store 117) and/or SSD data cache 119. Segment store 117 may be configured to store and retrieve deduplicated segments to and from storage units 108-109. In another embodiment, segment store 117 includes deduplication storage engine 107 (not shown) and deduplicates file segments prior to storing the segments in storage units 108-109. Cache manager 180 is configured to manage access of a cache memory device, such as SSD device 119 operating as a cache memory device with respect to storage units 108-109.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication storage engine or deduplication logic 107 is configured to segment the data file into multiple segments (also referred to as chunks) according to a variety of segmentation policies or rules. Deduplication storage engine 107 may be implemented as part of content store 115 and/or segment store 117. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2:
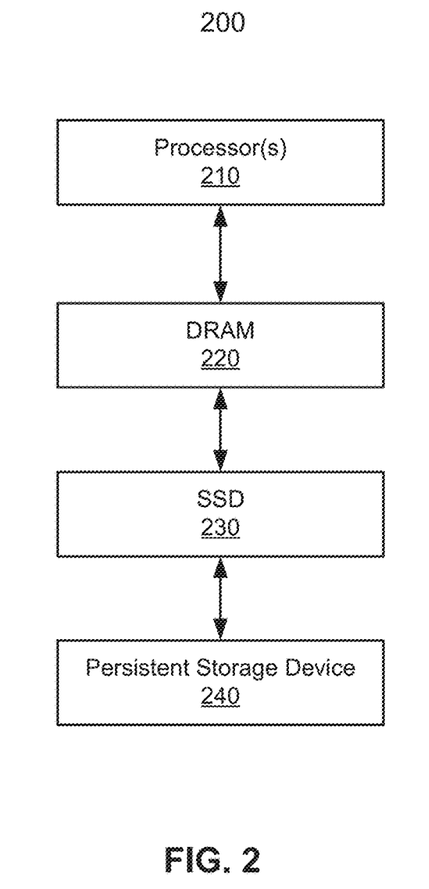
FIG. 2 is a block diagram of a cache hierarchy according to one embodiment of the invention.

FIG. 2 is a block diagram of a cache hierarchy according to one embodiment of the invention. Referring to FIG. 2, cache hierarchy 200 includes one or more processors 210, DRAM 220, SSD 230, and persistent storage device 240. Processor(s) 210 may have direct access to DRAM 220. DRAM 220 is fast with low latency, but is generally small in size due to its high cost. While SSD 230 can be larger than DRAM 220 and faster than persistent storage device 240, it is still multiple orders of magnitude smaller and multiple orders of magnitude more expensive than persistent storage device 240 (e.g., hard disks). As such, SSD 230 can effectively serve as a caching layer between DRAM 220 and persistent storage device 240, as shown in FIG. 2.

By expanding the cache size of a backup storage system, for example, system performance generally improves, or a system can service a greater number of client requests. Cached content, for example, may include file system data or meta data, data structures for processes, database records, indexes for content stored either locally or remotely, web server content, or numerous other examples.

Figure 3:
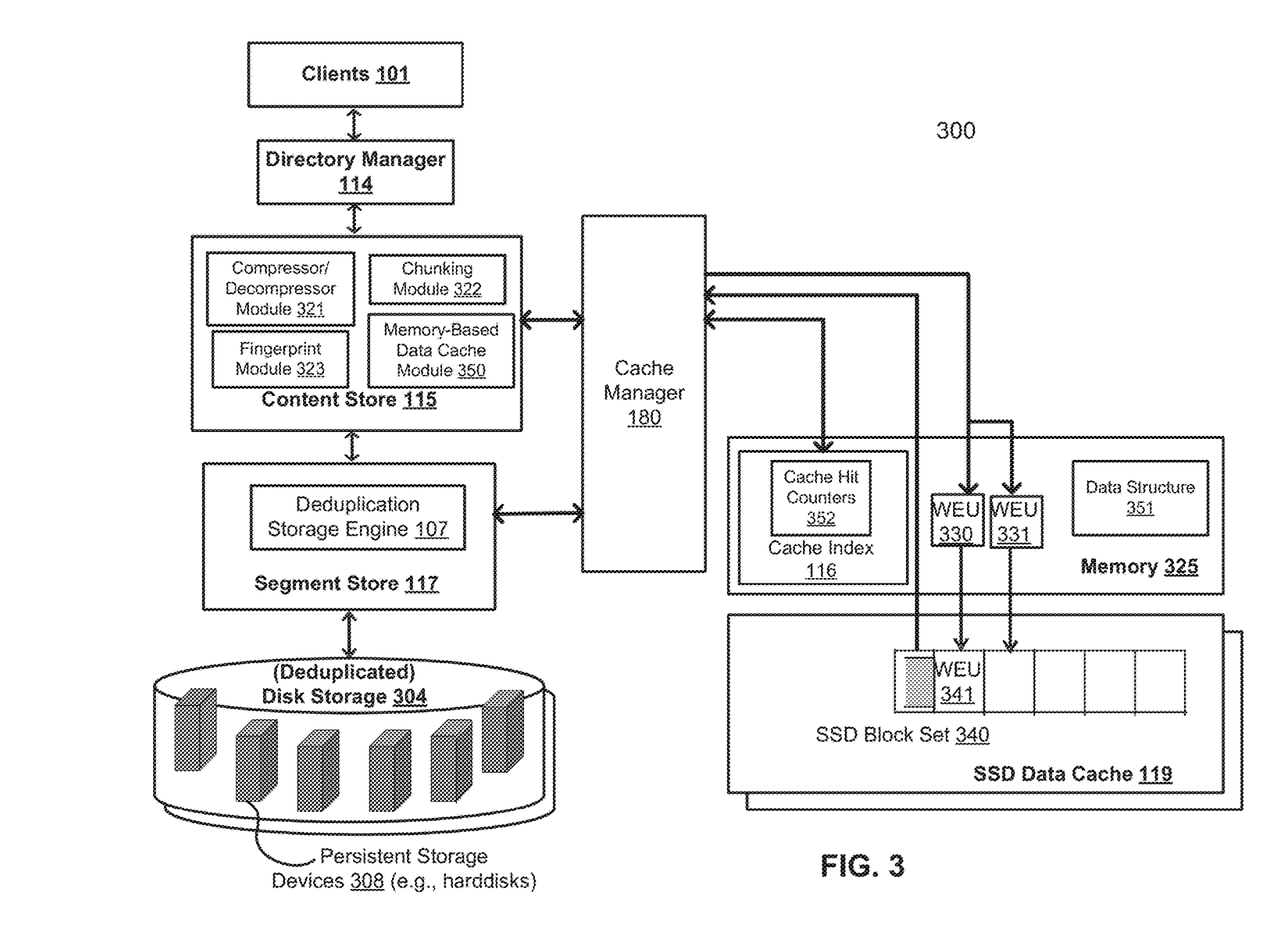
FIG. 3 is a block diagram illustrating example architecture of a storage system according to one embodiment of the invention.

FIG. 3 is a block diagram illustrating example architecture of a storage system according to one embodiment of the invention. System 300 may be implemented as a part of storage system 104 of FIG. 1. Referring to FIG. 3, storage system 300 includes, but is not limited to, one or more clients 101 communicatively coupled to directory manager 114 over a network (not shown). Directory manager 114 is communicatively coupled to content store 115. Directory manager 114 may be executed by a processor to provide a client interface to access files, via file handles, from the storage system. In addition, cache manager 180 is coupled to content store 115 and segment store 117 for accessing one or more SSD devices of SSD data cache 119.

At the bottom of FIG. 3 is disk storage 304 for storage of data. Disk storage 304 may be deduplicated and partitioned into containers (not shown). Each container may be made up of multiples of persistent storage devices 308, which may be implemented by spinning hard drives for a large capacity. Disk storage 304 may also contain file recipes, including file handles, fingerprints of data, and fingerprints of metadata such as nodes of a Merkle tree. Disk storage 304 may be one or more storage units 108-109 of storage system 104 of FIG. 1.

SSD data cache or cache 119 is a persistent cache memory device (such as a solid state device, SSD or flash memory), or simply referred to as cache, to accelerate performance. In cache 119, data are stored and evicted using a basic data structure referred to as a write-evict unit (WEU), such as WEU 341 of FIG. 3. WEU is a data unit that is written, erased, and/or evicted as a whole unit into and from SSD data cache 119. Content store 115 is configured to evict, via cache manager 180, WEUs no longer needed and free space to cache WEUs for new requests. The need of a WEU stems from the fact that cache 119 has limitations different from spinning hard disks, for example, a SSD storage unit must be explicitly erased before being overwritten, and the unit of erasure (up to MB(s) in size) is much larger than the unit of individual writes in disk storage (e.g., 4 kilobytes). In addition, writes wear out the SSD storage over time; therefore, less frequent write is more desirable. Here, a WEU unit may be configured to match a erasure unit of SSD devices of cache 119.

Furthermore, WEU as its basic data structure may be different from data structures such as chunks used in containers of the underlying disk storage 304. WEU is formed by multiple (and compressed) file extents or segments, which may be comprised of fixed-size blocks representing consecutive bytes (often many kilobytes) according to one embodiment of the invention. The consecutive bytes are within a single file in one embodiment. Extents may be the same as or different from file chunks depending on implementation. An extent may be an access unit size (the unit of read from the cache) that is performed by cache 119 in response to a request to access a file block of a file. A block (also referred to as a file block) is a data unit of each IO request to read or write to the underlying storage system. In this example, data requested by a higher file system layer (such as NFS) is in the form of block requests, which are converted to extent requests in the cache, while data being written in cache 119 is in a form of a WEU. A WEU, such as WEU 341, includes multiple extents, each of which is compressed therein where each extent can be independently read and accessed to satisfy read requests from the higher layers of the file system. The size of a WEU may be configured to match an erasure unit size of cache 119, which depends upon the specification or characteristics of cache 119. As a result, the lifespan of the cache 119 can be improved.

Memory 325 may be part of system memory of a storage system such as storage system 104 of FIG. 1. Memory 325 may be dynamic RAM (DRAM) or non-volatile RAM (NVRAM) or a combination thereof in one embodiment. Memory 325 contains cache index 116, which interacts with content store 115 (to index Merkle tree segments stored in cache 119 by storing portions of fingerprints of these segments in cache index 116) to accelerate reading from and writing data to cache 119. Cache index 116 interacts with WEUs 330-331 and WEU 341 for caching file extents in and evicting from cache 119 to accelerate system performance.

Segment store 117 may be part of storage service engine/logic of storage system 104, such as storage logic 106 of storage system 104 of FIG. 1. Segment store 117 may contain deduplication storage engine 107 in one embodiment. Segment store 117 interacts with content store 115 to store/retrieve data segments/chunks to/from disk storage 304. Segment store 117 may interact with memory 325 to store data segments that is retrieved from disk storage 304 to SSD data cache 119 for subsequent access.

Content store 115 may be part of storage service engine/logic of storage system 104, such as storage logic 106 of storage system 104 of FIG. 1. Content store 115 includes compressor/decompressor module 321, chunking module 322, fingerprint module 323, and memory-based data cache module 350 in one embodiment. Content store 115 interacts with segment store 117, memory 325, cache 119, and directory manager 114 in one embodiment. For example, when data, such as a file, is read by a client, content store 115 receives a data segments read request via directory manager 114. Content store 115 may identify fingerprints associated with the file segments by traversing a file Merkle tree. In another embodiment, directory manager 114 traverses a file Merkle tree to identify the fingerprints. Content store 115 looks up cache index 116 from memory 325 to identify an index entry based on the fingerprints to obtain information about previously stored segments. An index entry may include information such as WEU identifier, physical offset, and content type L0/LP, associated with the physical location of the WEU storing the requested data segment. Content store 115 accesses cache 119 via cache manager 180 to retrieve a compressed data segment based on index entry information. Content store 115 extracts and decompresses the compressed data segment and returns the data segment to the client without accessing disk storage 304.

In one embodiment, in response to determining that a cache index entry does not exist in cache index 116, content store 115 looks up in a second index (not shown) based on the fingerprint of the requested data segment to identify a container ID identifying a container storing the requested data segment in disk storage 304 (i.e., one or more storage units 108-109 of FIG. 1). The second index may be stored in memory 325 or in disk storage 304. Content store 115 retrieves compressed data segment via segment store 117 from an identified container of a storage unit, decompresses, and returns the retrieved data segment to the client.

In addition, the retrieved decompressed data segment is further divided into segments for storage via chunking module 322. Compressor/decompressor module 321 of content store 115 compresses the segments and content store 115 stores them into one or more WEUs, such as WEUs 330-331. WEUs 330-331 are then cached via cache manager 180 into SSD data cache 119. Content store 115 subsequently updates cache index 116 by inserting a new entry in cache index 116 to map the fingerprint of the data segment to one or more WEU IDs (e.g., WEUs 330-331) of WEUs to be stored in SSD data cache 119.

In one embodiment, cache index 116 includes a number of index entries, each entry corresponds to one of a number of segments stored in cache 119. Each entry of cache index 116 contains a fingerprint of the underlying segment or a portion thereof, and at least the information to map the fingerprint to a physical storage location of a corresponding WEU in the SSD device, i.e., physical block or WEU ID, and a physical offset.

In one embodiment, the second index includes a number of index entries, each entry mapping a fingerprint of a corresponding data segment to a container ID identifying a container of the storage unit storing the corresponding data segment, i.e., container ID of one or more containers of disk storage 304 storing a corresponding data segment. In one embodiment, cache 119 stores a number of WEUs, such as WEU 341, such that the WEUs are written, erased, and/or evicted as a whole unit into and from cache 119 altogether.

Memory-based data cache module 350 controls caching policy of a cache hierarchy. Generally, data segments that have a high accessed frequency may be cached in memory 325, data segments that have a moderate accessed frequency may be cached in SSD data cache 119, and data segments that are non-frequently accessed may be cached in one or more persistent storage devices 308. Memory-based data cache module 350, for example, may determine whether a cache hit for a data segment or page, for example using one of cache hit counters 352, has occurred for more than a cache hit threshold (e.g., 10 hits), and whether the data segment has been accessed within a previous predetermined time period (e.g., within a last hour). If so, memory-based data cache module 350 may push the data segment into memory 325 for caching. Otherwise, memory-based data cache module 350 may push the data segment into SSD data cache 119 (e.g., by writing the data segment in WEU 341) for caching.

Memory-based data cache module 350 continues to track the total cache hits (via cache hit counters 352) associated with the data segment within cache index 116 while the data segment is stored or cached in memory 325. The total cache hits, for example, may be cache hits for a particular segment from memory 325, SSD data cache 119, and/or disk storage 304. Cache hits within memory 325, however, are separately tracked, as discussed with respect to FIG. 4 herein below. Data caching within memory 325 may be represented by data structure 351, as also discussed with respect to FIG. 4 herein below. Data structure 351, for example, can be a hash table or map with bucket chaining.

Figure 4:
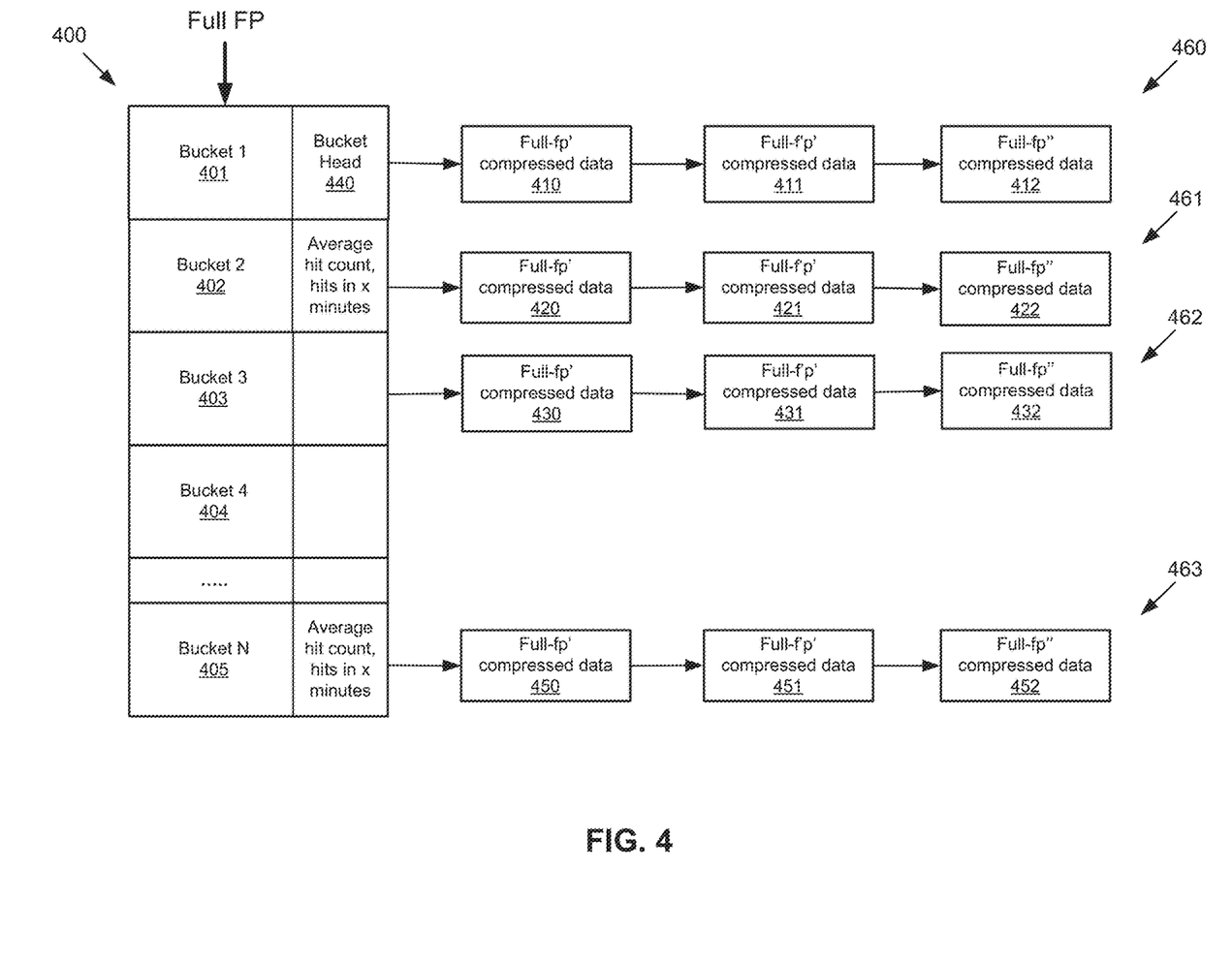
FIG. 4 is a diagram illustrating an example of a data structure according to one embodiment of the invention.

FIG. 4 is a diagram illustrating an example of a data structure according to one embodiment of the invention. Such data structure may be, for example, the data structure 351 of FIG. 3. In FIG. 4, data structure 400 (e.g., a hash table or hash map) includes one or more buckets 401-405 and bucket head 440. Each of the buckets 401-405 includes a respective bucket chain (as shown with bucket chains 460-463), with each bucket chain storing one or more data segments. For example, referring to FIG. 4, bucket chain 460 stores data segments 410-412 (which may be compressed or uncompressed segments), bucket chain 461 stores data segments 420-422, bucket chain 462 stores data segments 430-432, and bucket chain 463 stores data segments 450-452.

In FIG. 4, when a read of a data segment associated with a file object occurs, the data segment (which may be referred to as "Full FP") is hashed (e.g., using a hash function) to obtain or get to buckets 401-405 (e.g., via a key assigned to each of buckets 401-405). Bucket chains 460-463 are then traversed to find a matching data segment (e.g., any of data segments 410-412, 420-422, 430-432 and/or 450-452). In some embodiments, each of buckets 401-405 may include a head entry (not shown) having a bucket hit counter associated with the bucket's respective bucket chain (e.g., bucket chains 460-463). The bucket hit counter, for example, keeps track of the cache hits associated with one or more data segments within a particular bucket chain. The head entry may further include an access bit to indicate whether any data segment within the bucket chain was accessed within a previous time period (e.g., 10 minutes). If a bucket was not accessed within the previous time period or the bucket hit counter associated with the bucket's respective bucket chain is low (e.g., no more than 10 hits) or does not exceed a bucket hit threshold (e.g., 10 hits), then the bucket is evicted from data structure 400. The evicted bucket may subsequently be stored in SSD, for example SSD data cache 119 of FIG. 3, and/or a disk storage, for example disk storage 304 of FIG. 3.

In some embodiments, one or more pool of entries may be used to store data segments 410-412, 420-422, 430-432 and/or 450-452. When the pool(s) fall short of entries, for example, bucket head 440 can be traversed to determine if any entries in the bucket can be evicted for incoming entries. In some embodiments, eviction of an entry may be performed by traversing bucket head 440 to find a bucket chain (e.g., bucket chains 460-463) with the lowest average hit count and is not accessed within the predetermined time period.

Figure 5:
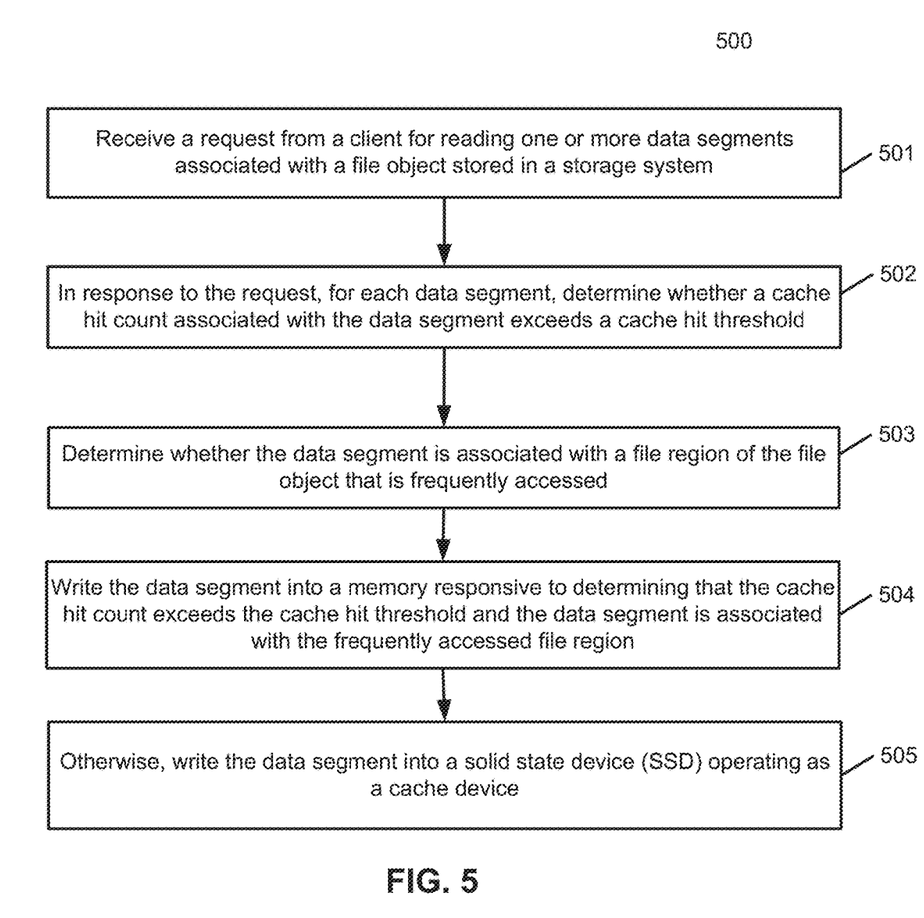
FIG. 5 is a flow diagram illustrating a method to write data segments to a data cache of a storage system according to one embodiment of the invention.

FIG. 5 is a flow diagram illustrating a method to write data segments to a data cache of a storage system according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by memory-based data cache module 350 of FIG. 3.

Referring to FIG. 5, at block 501, processing logic receives a request from a client for reading one or more data segments associated with a file object stored in a storage system. At block 502, in response to the request, for each data segment, the processing logic determines whether a cache hit counter associated with the data segment exceeds a cache hit threshold. At block 503, the processing logic determines whether the data segment is associated with a file region of the file object that is frequently accessed. At block 504, the processing logic writes the data segment into a memory responsive to determining that the cache hit count exceeds the cache hit threshold and the data segment is associated with the frequently accessed file region. Otherwise, at block 505, the processing logic writes the data segment into a SSD operating as a cache device.

Figure 6:
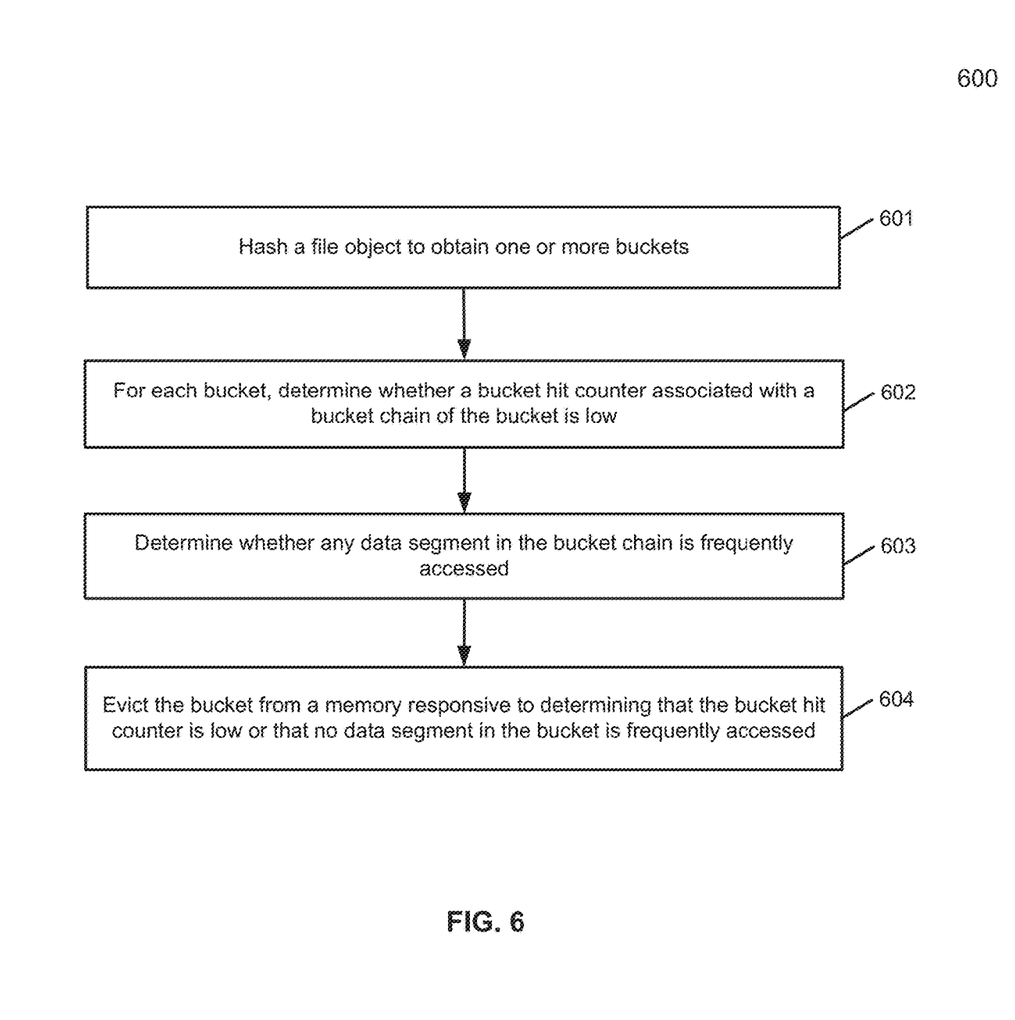
FIG. 6 is a flow diagram illustrating a method to evict one or more buckets from a memory according to one embodiment of the invention.

FIG. 6 is a flow diagram illustrating a method to evict one or more buckets from a memory according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by memory-based data cache module 350 of FIG. 3.

Referring to FIG. 6, at block 601, processing logic hashes a file object to obtain one or more buckets. At block 602, for each bucket, the processing logic determines whether a bucket hit counter associated with a bucket chain of the bucket is low. At block 603, the processing logic determines whether any data segment in the bucket chain is frequently accessed. At block 604, the processing logic evicts the bucket from a memory responsive to determining that the bucket hit counter is low or that no data segment in the bucket is frequently accessed.

Note that some or all of the components as shown and described above (e.g., content store 115 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
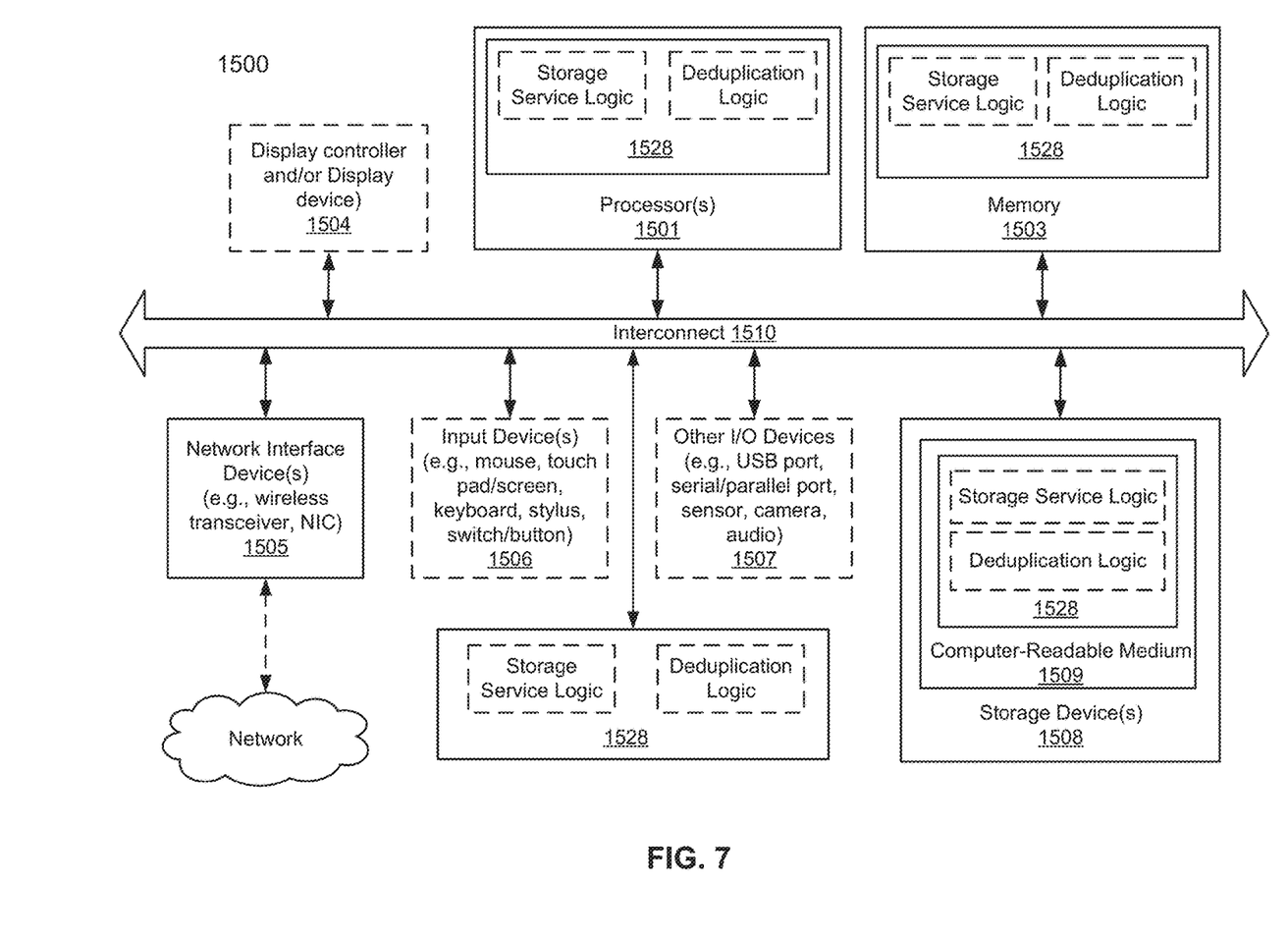
FIG. 7 is a block diagram illustrating a data processing system according to one embodiment.

FIG. 7 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for memory-based data caching, the method comprising:
   receiving a request from a client for reading a data segment associated with a file object stored in a storage system;
   in response to the request,
      determining whether a cache hit counter associated with the data segment exceeds a cache hit threshold;
      determining whether the data segment is associated with a file region of the file object that is frequently accessed;
      writing the data segment into a memory responsive to determining that the cache hit counter exceeds the cache hit threshold and the data segment is associated with the frequently accessed file region, wherein the memory has stored therein a hash, table or map including one or more buckets, each of the one or more buckets including a respective bucket chain and a respective head entry, each bucket chain storing one or more data segments, and wherein a bucket hit counter and an access bit indicative if any data segment in the bucket is frequently accessed are encapsulated within the head entry; and otherwise, writing the data segment into a solid state device (SSD) operating as a cache device.

2. The method of claim 1, further comprising:

hashing the data segment to obtain one or more buckets;

for each bucket:

determining whether a bucket hit counter associated with a bucket chain of the bucket is low;

determining whether any data segment in the bucket chain is frequently accessed; and evicting the bucket from the memory responsive to determining that the bucket hit counter is low or that no data segment in the bucket is frequently accessed.

3. The method of claim 2, wherein a data segment in the bucket chain is frequently accessed if the data segment is accessed within a predetermined time period within the bucket chain.

4. The method of claim 1, further comprising tracking the cache hit counter associated the data segment, wherein the cache hit counter is indicative of cache hits from the memory, the SSD operating as a cache device, and a disk storage.

5. The method of claim 4, wherein the cache hit counter is stored in a cache index within the memory.

6. The method of claim 1, wherein the cache hit threshold is 10 hits.

7. The method of claim 1, wherein the frequently accessed file region is a region that is accessed within a previous hour.

8. A non-transitory machine-readable medium having instructions stored therein, which when executed by a processor, cause the processor to perform operations for memory-based data caching, the operations comprising:

receiving a request from a client for reading a data segment associated with a file object stored in a storage system;

in response to the request, determining whether a cache hit counter associated with the data segment exceeds a cache hit threshold;

determining whether the data segment is associated with a file region of the file object that is frequently accessed;

writing the data segment into a memory responsive to determining that the cache hit counter exceeds the cache hit threshold and the data segment is associated with the frequently accessed file region, wherein the memory has stored therein a hash table or map including one or more buckets, each of the one or more buckets including a respective bucket chain and a respective head entry, each bucket chain storing one or more data segments, and wherein a bucket hit counter and an access bit indicative if any data segment in the bucket is frequently accessed are encapsulated within the head entry; and otherwise, writing the data segment into a solid state device (SSD) operating as a cache device.

9. The non-transitory machine-readable medium of claim 8, wherein the operations further comprise:

hashing the data segment to obtain one or more buckets;

for each bucket:

determining whether a bucket hit counter associated with a bucket chain of the bucket is low;

determining whether any data segment in the bucket chain is frequently accessed; and evicting the bucket from the memory responsive to determining that the bucket hit counter is low or that no data segment in the bucket is frequently accessed.

10. The non-transitory machine-readable medium of claim 9, wherein a data segment in the bucket chain is frequently accessed if the data segment is accessed within a predetermined time period within the bucket chain.

11. The non-transitory machine-readable medium of claim 8, wherein the operations further comprise:

tracking the cache hit counter associated the data segment, wherein the cache hit counter is indicative of cache hits from the memory, the SSD operating as a cache device, and a disk storage.

12. The non-transitory machine-readable medium of claim 11, wherein the cache hit counter is stored in a cache index within the memory.

13. The non-transitory machine-readable medium of claim 8, wherein the cache hit threshold is 10 hits.

14. The non-transitory machine-readable medium of claim 8, wherein the frequently accessed file region is a region that is accessed within a previous hour.

15. A data processing system, comprising:

a processor; and a memory coupled to the processor to store instructions, which when executed by the processor, cause the processor to perform operations, the operations comprising:

receiving a request from a client for reading a data segment associated with a file object stored in a storage system;

in response to the request, determining whether a cache hit counter associated with the data segment exceeds a cache hit threshold;

determining whether the data segment is associated with a file region of the file object that is frequently accessed;

writing the data segment into a memory responsive to determining that the cache hit counter exceeds the cache hit threshold and the data segment is associated with the frequently accessed file region, wherein the memory has stored therein a hash table or map including one or more buckets, each of the one or more buckets including a respective bucket chain and a respective head entry, each bucket chain storing one or more data segments, and wherein a bucket hit counter and an access bit indicative if any data segment in the bucket is frequently accessed are encapsulated within the head entry; and otherwise, writing the data segment into a solid state device (SSD) operating as a cache device.

16. The data processing system of claim 15, wherein the operations further comprise:

hashing the data segment to obtain one or more buckets;

for each bucket:

determining whether a bucket hit counter associated with a bucket chain of the bucket is low;

determining whether any data segment in the bucket chain is frequently accessed; and evicting the bucket from the memory responsive to determining that the bucket hit counter is low or that no data segment in the bucket is frequently accessed.

17. The data processing system of claim 15, wherein the operations further comprise:

tracking the cache hit counter associated the data segment, wherein the cache hit counter is indicative of cache hits from the memory, the SSD operating as a cache device, and a disk storage.

\* \* \* \* \*